US008237430B2

(12) United States Patent
Thode et al.

(10) Patent No.: US 8,237,430 B2
(45) Date of Patent: Aug. 7, 2012

(54) DISPLACEMENT SENSOR FOR A ROD

(75) Inventors: Oliver Thode, Stuttgart (DE); Jorg Siebert, Esslingen (DE); Martin Rust, Beilstein (DE)

(73) Assignee: Norgren GmbH, Alpen (DE)

( * ) Notice: Subject to any disclaimer, the term of this patent is extended or adjusted under 35 U.S.C. 154(b) by 429 days.

(21) Appl. No.: 12/293,873

(22) PCT Filed: Mar. 28, 2006

(86) PCT No.: PCT/EP2006/002802
§ 371 (c)(1),
(2), (4) Date: Sep. 22, 2008

(87) PCT Pub. No.: WO2007/110095
PCT Pub. Date: Oct. 4, 2007

(65) Prior Publication Data
US 2009/0102462 A1    Apr. 23, 2009

(51) Int. Cl.
*G01B 7/14*    (2006.01)
(52) U.S. Cl. ........... 324/207.2; 324/207.21; 324/207.22; 324/207.24; 137/553; 137/554; 92/5 R
(58) Field of Classification Search .................. 324/202, 324/207.21, 207.2, 207.22, 207.24
See application file for complete search history.

(56) References Cited

U.S. PATENT DOCUMENTS

| | | |
|---|---|---|
| 4,839,591 A | 6/1989 | Nomura et al. |
| 5,045,785 A * | 9/1991 | Hansen .................. 324/207.16 |
| 5,318,616 A | 6/1994 | Keller |
| 5,450,930 A | 9/1995 | Martens et al. |
| 5,670,876 A * | 9/1997 | Dilger et al. ............. 324/207.13 |
| 5,826,616 A | 10/1998 | Golden |
| 6,220,284 B1 | 4/2001 | Hayashi et al. |
| 6,253,460 B1 * | 7/2001 | Schmitz ........................ 33/706 |
| 6,505,642 B2 | 1/2003 | Miyazoe et al. |
| 6,520,202 B2 | 2/2003 | Miyazoe et al. |
| 6,612,333 B2 | 9/2003 | Miyazoe et al. |
| 6,823,725 B2 * | 11/2004 | Lohberg ..................... 73/114.01 |
| 6,867,583 B2 * | 3/2005 | Mizutani et al. ......... 324/207.24 |
| 6,886,333 B2 | 5/2005 | Feigel et al. |
| 2002/0157531 A1 | 10/2002 | Kadlicko |
| 2004/0155647 A1 * | 8/2004 | Green et al. ............... 324/207.2 |
| 2004/0226183 A1 | 11/2004 | Sielemann |
| 2005/0231193 A1 * | 10/2005 | Yamamoto et al. ........ 324/207.2 |
| 2007/0145969 A1 * | 6/2007 | Rosplock ................... 324/207.2 |

FOREIGN PATENT DOCUMENTS

| | | |
|---|---|---|
| DE | 3246731 A1 | 6/1984 |
| DE | 10145313 A1 | 7/2002 |
| DE | 10248148 A1 | 4/2004 |
| EP | 1217221 A2 | 6/2006 |
| JP | 1105094 A | 4/1989 |
| JP | HEI0344617 U | 4/1991 |

* cited by examiner

*Primary Examiner* — Kenneth J Whittington
*Assistant Examiner* — Son Le
(74) *Attorney, Agent, or Firm* — The Ollila Law Group LLC

(57) ABSTRACT

The displacement sensor (100) includes a rod (103) including a conical convex graduated magnetically anomalous region (105) and a magnetic sensor (110) located in close proximity to the concical convex graduated magnetically anomalous region (105). The magnetic sensor (110) generates a positional signal that is related to the position of the concical convex graduated magnetically anomalous region (105) in relation to the magnetic sensor (110).

19 Claims, 6 Drawing Sheets

DISPLACEMENT SENSOR FOR A ROD

BACKGROUND OF THE INVENTION

1. Field of the Invention

The present invention relates to a displacement sensor, and more particularly, to a displacement sensor for a rod.

2. Statement of the Problem

A piston comprises a device that moves linearly within a bore in order to perform mechanical work, such as providing pressure to a fluid or to move a fluid. In addition, a piston can move in response to the introduction of a fluid into the bore or in response to removal of fluid from the bore. As a result, pistons are widely used to convert fluid movement into mechanical motion of the piston and to convert mechanical motion of the piston into fluid movement.

Pistons are widely used in industrial applications. Pistons are used to move fluids. Pistons are used in valves to control the flow of fluids, including liquids and gases. Because of these uses, it is often desirable to know an accurate and instantaneous displacement of a piston rod.

SUMMARY OF THE SOLUTION

A displacement sensor is provided according to an embodiment of the invention. The displacement sensor comprises a rod including a graduated magnetically anomalous region and a magnetic sensor located in close proximity to the graduated magnetically anomalous region. The magnetic sensor generates a positional signal that is related to the position of the graduated magnetically anomalous region in relation to the magnetic sensor.

A displacement sensor is provided according to an embodiment of the invention. The displacement sensor comprises a rod including a graduated magnetically anomalous region and a magnetic sensor located in close proximity to the graduated magnetically anomalous region. The magnetic sensor comprises a coupling member comprising two legs and a top end, two magnets affixed to bottom leg ends of the two legs of the coupling member, and a Hall Effect sensor affixed to the top end of the coupling member. The Hall Effect sensor is in magnetic communication with the two magnets. The magnetic sensor generates a positional signal that is related to the position of the graduated magnetically anomalous region in relation to the magnetic sensor.

A displacement sensor is provided according to an embodiment of the invention. The displacement sensor comprises a rod including a graduated magnetically anomalous insert and a magnetic sensor located in close proximity to the graduated magnetically anomalous insert. The magnetic sensor generates a positional signal that is related to the position of the graduated magnetically anomalous insert in relation to the magnetic sensor.

A displacement sensor is provided according to an embodiment of the invention. The displacement sensor comprises a substantially magnetic rod including a graduated bore portion and a magnetic sensor located in close proximity to the graduated bore portion. The magnetic sensor generates a positional signal that is related to the position of the graduated bore portion in relation to the magnetic sensor.

A displacement sensor is provided according to an embodiment of the invention. The displacement sensor comprises a substantially magnetic rod including a graduated magnetically anomalous region formed from the rod and a magnetic sensor located in close proximity to the graduated magnetically anomalous region. The magnetic sensor generates a positional signal that is related to the position of the graduated magnetically anomalous region in relation to the magnetic sensor.

ASPECTS OF THE INVENTION

In one embodiment of the displacement sensor, the graduated magnetically anomalous region is at least partially within the rod.

In another embodiment of the displacement sensor, the graduated magnetically anomalous region is substantially fully within the rod.

In yet another embodiment of the displacement sensor, the graduated magnetically anomalous region is substantially axially centered in the rod.

In yet another embodiment of the displacement sensor, the graduated magnetically anomalous region comprises a graduated magnetically responsive insert.

In yet another embodiment of the displacement sensor, the rod includes a hollow portion and the graduated magnetically anomalous region comprises a graduated magnetically responsive insert residing in the hollow portion.

In yet another embodiment of the displacement sensor, the rod is substantially magnetic and the graduated magnetically anomalous region comprises a graduated bore portion.

In yet another embodiment of the displacement sensor, the rod is substantially magnetic and the graduated magnetically anomalous region is formed from the rod.

In yet another embodiment of the displacement sensor, the magnetic sensor comprises a coupling member comprising two legs and a top end, two magnets affixed to bottom leg ends of the two legs of the coupling member, and a Hall Effect sensor affixed to the top end of the coupling member, wherein the Hall Effect sensor is in magnetic communication with the two magnets.

In yet another embodiment of the displacement sensor, the two magnets are substantially arranged along an arc corresponding to a rod surface.

In yet another embodiment of the displacement sensor, the two magnets comprise two substantially opposite magnets.

DESCRIPTION OF THE DRAWINGS

The same reference number represents the same element on all drawings. It should be understood that the drawings are not necessarily to scale.

DETAILED DESCRIPTION OF THE INVENTION

FIGS. 1-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
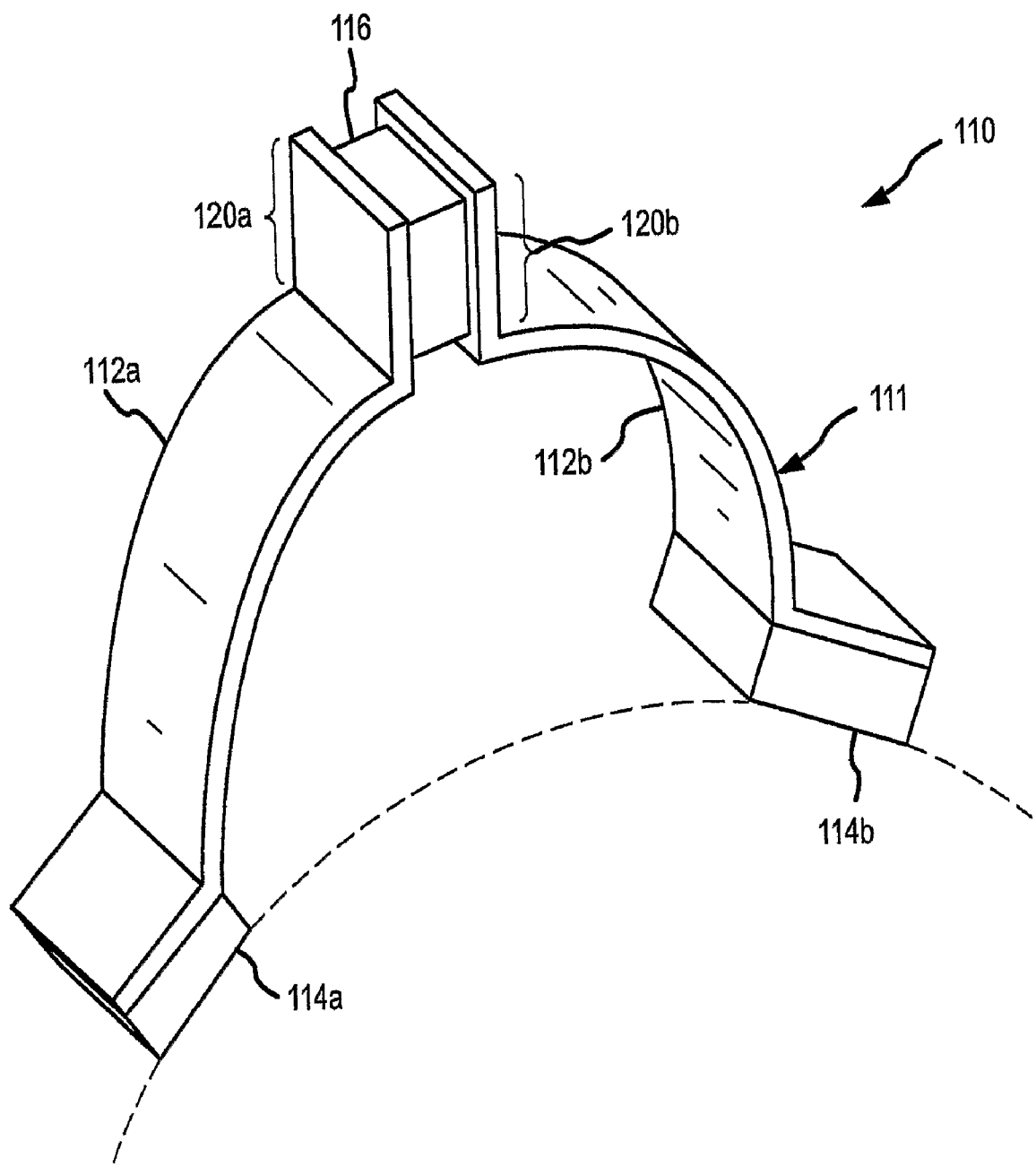
FIG. 1 shows a magnetic sensor according to an embodiment of the invention.

FIG. 1 shows a magnetic sensor 110 according to an embodiment of the invention. The magnetic sensor 110 is a component of a displacement sensor 100 (see FIG. 2). The displacement sensor 100 is discussed below in the context of a piston rod. However, it should be understood that the displacement sensor 100 of any embodiment can be used with any manner of displaceable rod or member.

The magnetic sensor 110 comprises two coupling members 111 including two legs 112a and 112b. The two legs 112a and 112b receive two corresponding magnets 114a and 114b. Each leg 112 includes a top end 120, wherein the Hall Effect sensor 116 is received between the two top ends 120a and 120b. The Hall Effect sensor 116 can be merely positioned between the two top ends 120a and 120b, or can be affixed, bonded, or clamped between the two top ends 120a and 120b in some manner. Alternatively, the coupling member 111 can comprise one piece that includes multiple legs 112.

In this embodiment, the magnets 114 are substantially arranged along an arc (see dashed line). The arc corresponds to a piston rod surface (see FIG. 2). In this manner, the full face area of a magnet 114 is placed in close proximity to the piston rod 103 and to the graduated magnetically anomalous region 105. Interaction between a magnet 114 and the graduated magnetically anomalous region 105 is therefore improved.

In one embodiment, the two magnets 114a and 114b are substantially opposite in position (i.e., such as 180 degrees apart, for example) around the graduated magnetically anomalous region 105. In this manner, the magnetic circuit can be optimally effective. However, it should be understood that where multiple magnets are employed, they can be positioned in any desired location or constellation around the graduated magnetically anomalous region 105.

Figure 2:
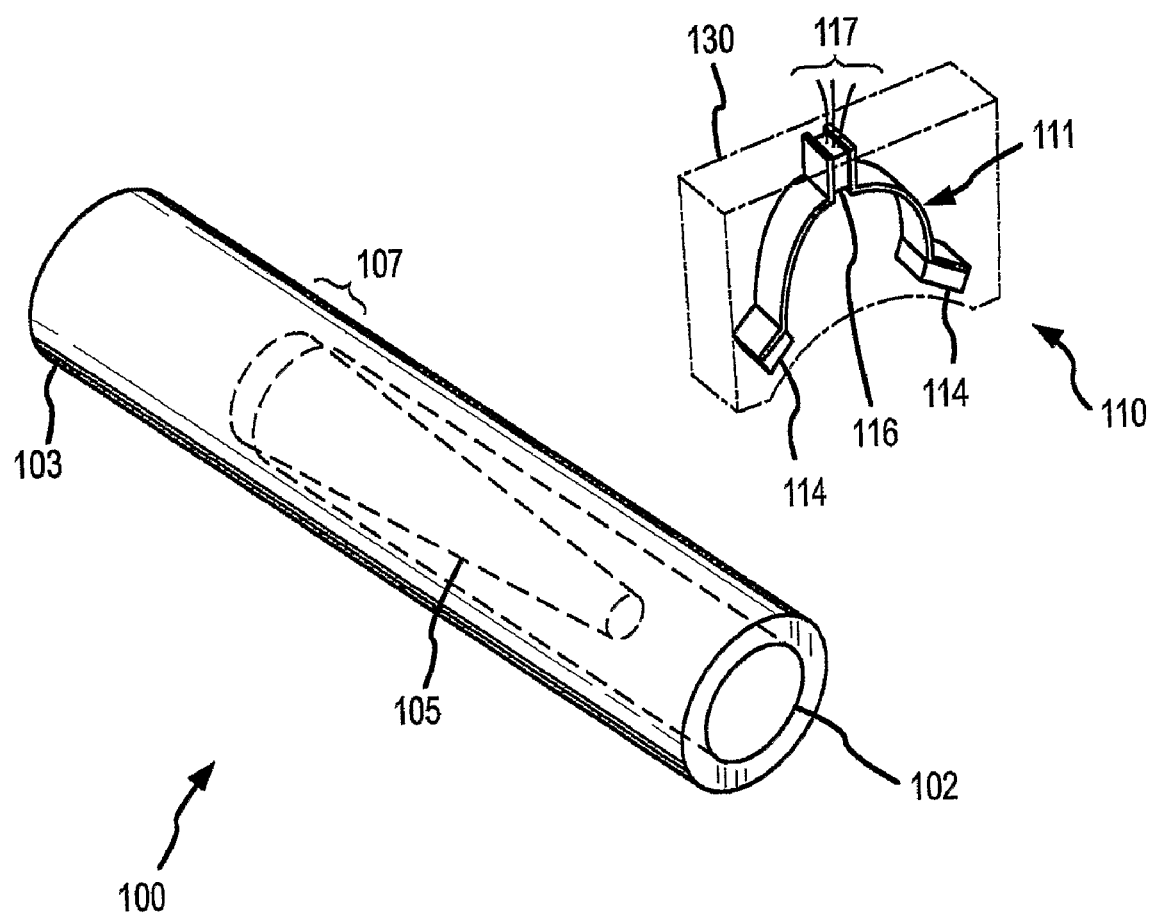
FIG. 2 shows a piston displacement sensor according to an embodiment of the invention.

FIG. 2 shows a piston displacement sensor 100 according to an embodiment of the invention. The piston displacement sensor 100 includes a graduated magnetically anomalous region 105 as part of a piston rod 103 and a magnetic sensor 110 in close proximity to the graduated magnetically anomalous region 105 (and in close proximity to the piston rod 103). However, it should be understood that the displacement sensor 100 can be employed with any manner of moving rod 103, and is not limited in application to a piston.

The magnetic sensor 110 does not need to contact the piston rod 103. Instead, the magnetic sensor 110 maintains a working gap G between itself and the graduated magnetically anomalous region 105 (see FIG. 9). In some embodiments, the working gap G changes in size as the piston rod 103 moves axially in relation to the magnetic sensor 110. It should also be understood that in some embodiments a fixed gap is maintained between the magnetic sensor 110 and the piston rod 103, independent of the working gap G.

The magnetic sensor 110 generates a positional signal that is related to the position of the graduated magnetically anomalous region 105 because the magnetic resistance is dependent on the position of the magnetic sensor 110 and the graduated magnetically anomalous region 105. The positional signal is generated by a magnetic interaction between the magnetic sensor 110 and the graduated magnetically anomalous region 105, as in the Hall Effect. The graduated magnetically anomalous region 105 in effect forms a magnetic circuit for the magnetic sensor 110. The size of the working gap G controls the effectiveness of the magnetic circuit. Therefore, the magnetic flux received and measured by the magnetic sensor 110 can be decreased by increasing the working gap G. If the piston rod 103 is moved toward the left in the figure, then the magnetic sensor 110 will measure a lower level of magnetic flux. Conversely, as the piston rod 103 is moved toward the right in the figure, the working gap G will be reduced and the magnetic sensor 110 will measure a higher level of magnetic flux.

The graduated magnetically anomalous region 105 can comprise any material that responds to magnetic flux in some manner. The graduated magnetically anomalous region 105 can conduct or transmit the magnetic flux. For example, where the graduated magnetically anomalous region 105 has a high magnetic permeability, the graduated magnetically anomalous region 105 will conduct magnetic flux. As a result, the magnetic sensor 110 will receive and detect more magnetic flux. Alternatively, the graduated magnetically anomalous region 105 can possess a level of magnetism that is less than or greater than a magnetism of the surrounding piston rod 103. Therefore, because the graduated magnetically anomalous region 105 is magnetically anomalous, the magnetic sensor 110 can detect a varying positional signal that enables determination of the position of the piston rod 103.

The graduated magnetically anomalous region 105 in one embodiment comprises an insert that is cast into or otherwise embedded in the piston rod 103 (also see FIGS. 4 and 6-8). Alternatively, the graduated magnetically anomalous region 105 can be an insert that is inserted into and resides in a hollow portion 102. The graduated magnetically anomalous region 105 can comprise a solid insert, such as a magnetically responsive metal or metal compound or a magnetically responsive ceramic or ceramic compound. Alternatively, the graduated magnetically anomalous region 105 can comprise a hollow vessel filled with a magnetically responsive fluid. In another alternative, the graduated magnetically anomalous region 105 comprises a graduated bore portion 105 in the piston rod 103 (see FIG. 3), wherein the bore or shaped region interacts with the magnetic sensor 110. In yet another embodiment, the graduated magnetically anomalous region 105 comprises a graduated magnetically anomalous region 105 formed from the piston rod 103 (see FIG. 5).

In one embodiment of the piston displacement sensor 100, the graduated magnetically anomalous region 105 is at least partially within the piston rod 103. In another embodiment, the graduated magnetically anomalous region 105 is substantially fully within the piston rod 103. In yet another embodiment, the graduated magnetically anomalous region 105 is substantially axially centered in the piston rod 103.

The graduated magnetically anomalous region 105 is graduated in some manner. In the embodiment shown, the graduated magnetically anomalous region 105 is substantially conical. However, other shapes can be employed (see FIGS. 6-8). As a result, the magnetic sensor 110 can produce a positional signal that varies in relation to the graduated magnetically anomalous region 105. When the magnetic sensor 110 is at a larger end of the graduated magnetically anomalous region 105, in one embodiment the graduated magnetically anomalous region 105 will conduct more magnetic flux and therefore the positional signal will be increased. Conversely, when the magnetic sensor 110 is at a smaller end, the positional signal will be increased as more magnetic flux is conducted to the Hall Effect sensor 116 by the coupling member 111.

One benefit of the invention is that an absolute position of the piston can be accurately determined from the positional signal. Because of the graduation in the graduated magnetically anomalous region 105, the absolute position can be determined even when the piston is not moving or after a reset or loss of electrical power in an associated external controller or processor.

Another benefit of the invention is that the direction of motion of the piston can be accurately determined. The direction of motion can be determined from the signal level of the positional signal, wherein the signal level changes as the graduated size of the graduated magnetically anomalous region 105 increases or decreases.

Yet another benefit of the invention is that the velocity and acceleration of the piston can be provided. The velocity and acceleration can be determined from changes in the positional signal over time.

The magnetic sensor 110 includes a Hall Effect sensor 116 and an associated wiring harness 117, a coupling member 111 comprising two legs, and two magnets 114 corresponding to the two legs. It should be understood that more than two legs and two magnets can be used. The entire magnetic sensor assembly 110, and the graduated magnetically anomalous region 105, can be enclosed in the interior of a piston or valve.

The coupling member 111 comprises a magnetically soft or magnetically conducting material. For example, the coupling member 111 can be formed of iron, steel, or a ferritic steel. However, other magnetically conducting materials can be employed. As a result, a portion of the magnetic flux generated by the one or more magnets 114 is conducted by the coupling member 111 to the Hall Effect sensor 116. At the same time, the one or more magnets 114 will interact with the graduated magnetically anomalous region 105 if the magnetic sensor 110 is in close proximity. When the one or more magnets 114 are close to the graduated magnetically anomalous region 105 (i.e., when the working gap G is small), then a magnetic circuit is strong and the coupling member 111 will conduct a large amount of the magnetic flux from the one or more magnets 114 to the Hall Effect sensor 116. When the one or more magnets 114 are far away (i.e., a large working gap G), then the graduated magnetically anomalous region 105 will conduct a much smaller amount of the magnetic flux from the one or more magnets 114, wherein the amount of magnetism transferred by the coupling member 111 to the Hall Effect sensor 116 will be reduced. In this manner, the Hall Effect sensor 116 can produce a positional signal that is related to the position of the magnetically responsive insert in relation to the magnetic sensor 110.

In this embodiment, the piston rod 103 includes a hollow portion 102 and the graduated magnetically anomalous region 105 comprises a graduated magnetically anomalous insert 105. The graduated magnetically anomalous insert 105 is located in the hollow portion 102. The hollow portion 102 can be of any needed size or shape. The graduated magnetically anomalous insert 105 in one embodiment is glued or bonded in the hollow portion 102. Alternatively, the graduated magnetically anomalous insert 105 can be held in by a press or friction fit or can be blocked in by a plug or other sealing device (not shown). To this end, the graduated magnetically anomalous insert 105 can include a cylindrical portion 107. The cylindrical portion 107 can provide a friction fit in the hollow portion 102 or can provide a region for bonding the graduated magnetically anomalous insert 105 in the hollow portion 102.

In one embodiment, the magnetic sensor 110 can be embedded in a body 130 of a non-magnetically responsive material. The body 130 can comprise any magnetically non-conducting material, such as plastic, for example. The body 130 can be used to hold the components of the magnetic sensor 110 together as a unit. In addition, the body 130 can be used to mount or affix the magnetic sensor 100 to a nearby structure. In addition, the body 130 can be used to protect and/or seal the magnetic sensor 110.

Figure 3:
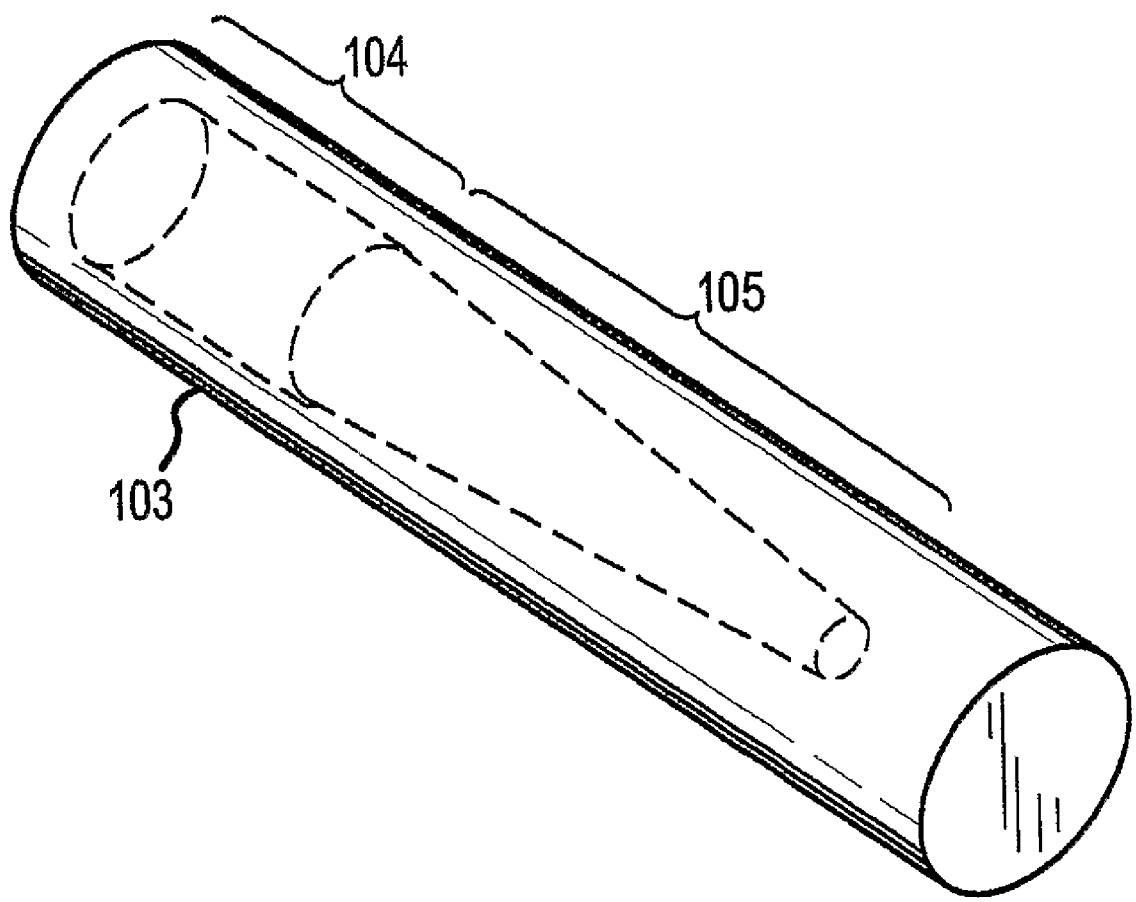
FIG. 3 shows a piston rod according to another embodiment of the invention.

FIG. 3 shows the piston rod 103 according to another embodiment of the invention. In this embodiment, the piston rod 103 is substantially magnetic. The piston rod 103 includes a straight bore portion 104 and a graduated bore portion 105. The graduated bore portion 105 comprises a graduated region of reduced magnetivity. The graduated bore portion 105 therefore interacts with the magnetic sensor 110 as previously described in order to generate the positional signal. The positional signal is therefore related to the position of the graduated bore portion 105 in relation to the magnetic sensor 110.

Figure 4:
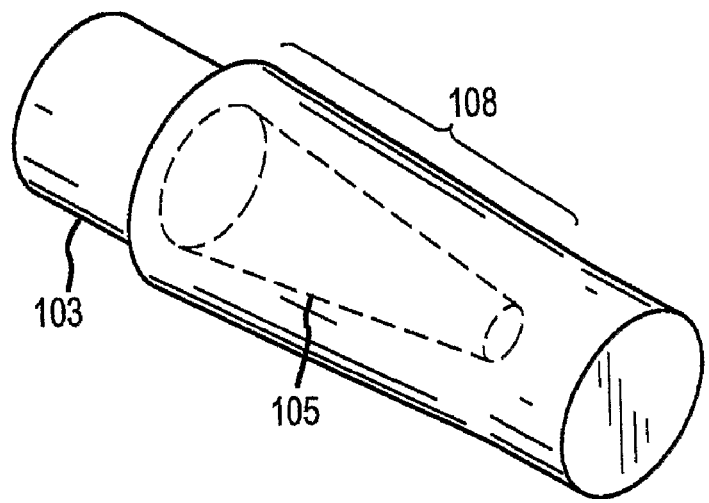
FIG. 4 shows the piston rod according to another embodiment of the invention.

FIG. 4 shows the piston rod 103 according to another embodiment of the invention. In this embodiment, the graduated magnetically anomalous region 105 is substantially axially embedded in the piston rod 103. In this embodiment, the diameter of the piston rod is not uniform in an embedded region 108. Instead, the diameter of the piston rod 103 is larger at one end of the embedded region 108, wherein the piston rod 103 therefore has a substantially uniform cross-sectional area of piston rod material around the graduated magnetically anomalous region 105. As a result, this embodiment does not suffer from reduced rod strength in the embedded region 108.

Figure 5:
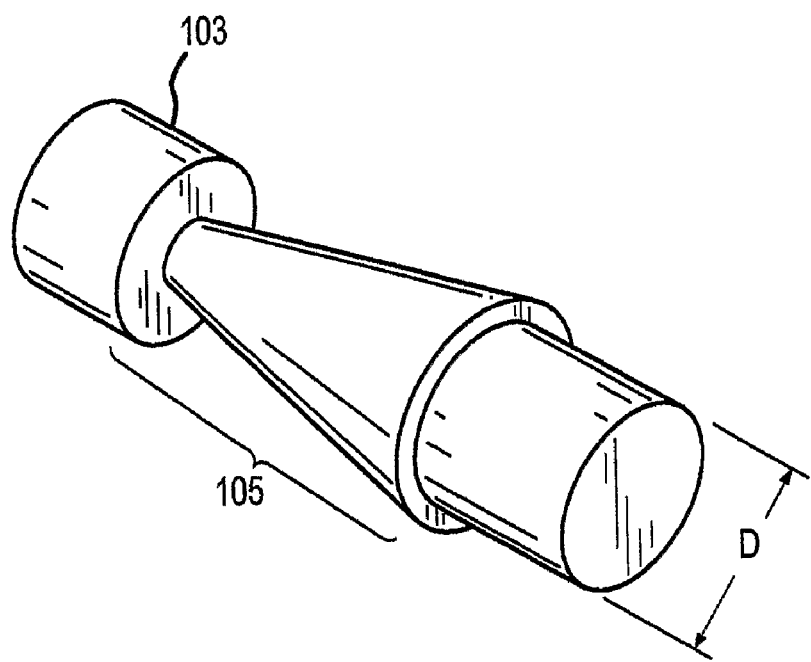
FIG. 5 shows the piston rod according to another embodiment of the invention.

FIG. 5 shows the piston rod 103 according to another embodiment of the invention. In this embodiment, the piston rod 103 is substantially magnetic and includes a graduated magnetically anomalous region 105 formed in the piston rod 103. The graduated magnetically anomalous region 105 in this embodiment can be formed in any manner, such as by casting or machining, for example. The graduated magnetically anomalous region 105 can include a diameter that is smaller than the normal diameter D of the piston rod 103. The graduated magnetically anomalous region 105 can include a diameter that is larger than the normal diameter D of the piston rod 103. In addition, the graduated magnetically anomalous region 105 can flare from a diameter that is smaller than the normal diameter D to a diameter that is larger than the normal diameter D, as is shown in the figure. This graduated magnetically anomalous region 105 interacts with the magnetic sensor 110 in order to generate the positional signal. The positional signal is therefore related to the position of the graduated magnetically anomalous region 105 in relation to the magnetic sensor 110.

Figure 6:
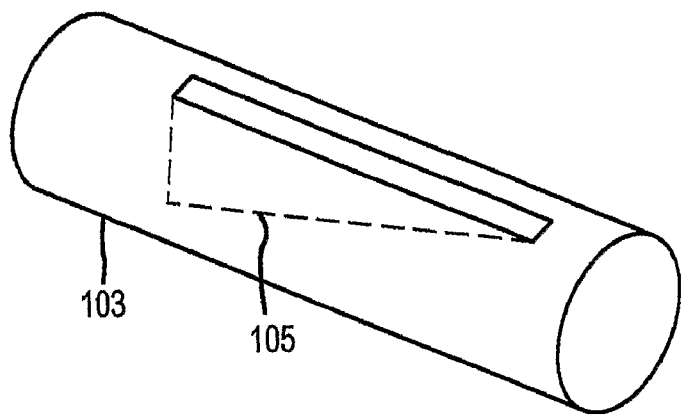
FIG. 6 shows the piston rod according to another embodiment of the invention.

FIG. 6 shows the piston rod 103 according to another embodiment of the invention. In this embodiment, the graduated magnetically anomalous region 105 comprises a wedge-shaped insert 105. The wedge-shaped insert 105 can be substantially rectangular in outline or can comprise any graduated wedge shape. The wedge-shaped insert 105 can be partially embedded in the piston rod 103, as shown, or can be completely embedded. Of course, the wedge shape of this figure (and FIGS. 7-8) will require that the piston rod 103 be constrained from rotating in order for the magnetic sensor 110 to function properly and effectively.

Figure 7:
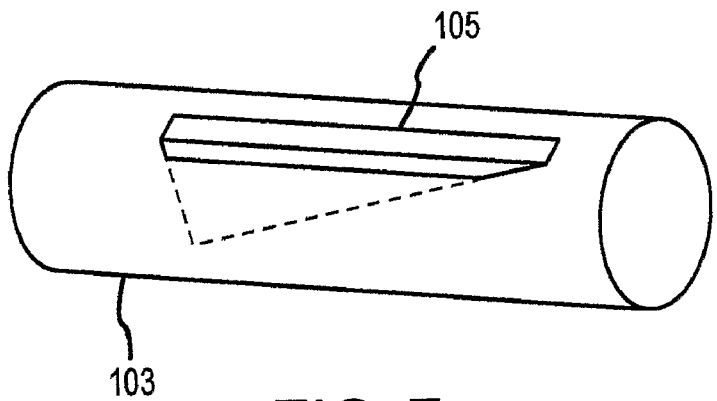
FIG. 7 shows the piston rod wherein the graduated magnetically anomalous insert is partially embedded.

FIG. 7 shows the piston rod 103 wherein the graduated magnetically anomalous insert 105 is partially embedded. As a result, a portion of the graduated magnetically anomalous insert 105 in this embodiment extends from the piston rod 103.

Figure 8:
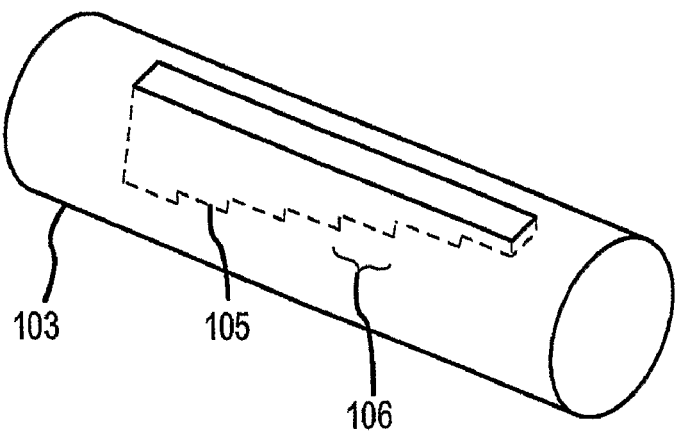
FIG. 8 shows the piston rod according to another embodiment of the invention.

FIG. 8 shows the piston rod 103 according to another embodiment of the invention. In this embodiment, the graduated magnetically anomalous region 105 comprises a stepped insert 105 including multiple steps 106. A step 106 can be of any desired shape or size. The stepped insert 105 can be completely embedded in the piston rod 103, as shown, or can be partially embedded.

Figure 9:
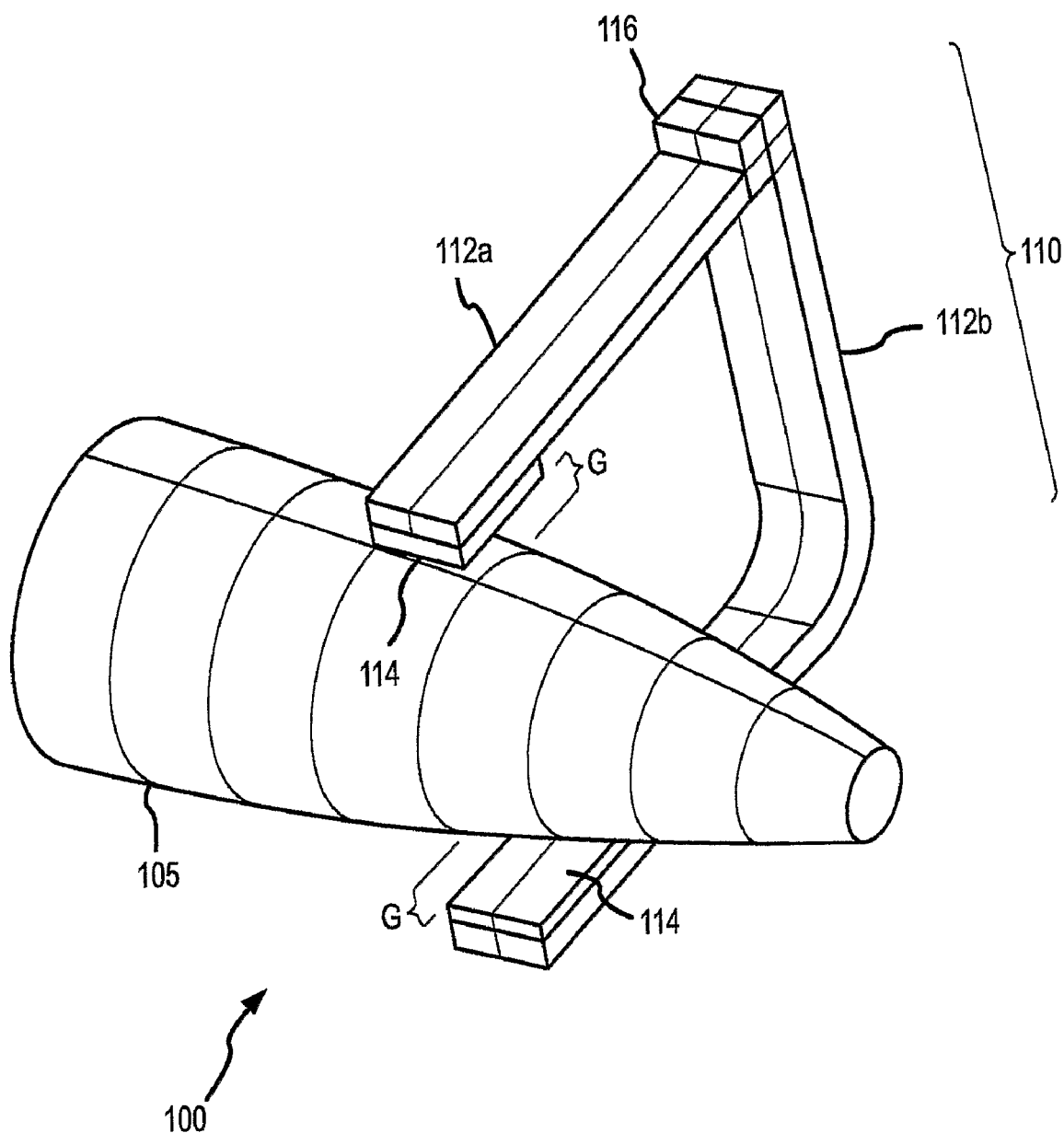
FIG. 9 shows the piston rod according to another embodiment of the invention.

FIG. 9 shows the piston displacement sensor 100 according to another embodiment of the invention. In this embodiment, the graduated magnetically anomalous region 105 comprises a curved conical shape. Consequently, the graduated magnetically anomalous region 105 comprises a substantially bulged or convex conical shape. The shape in this embodiment operates to substantially linearize the dependence of the magnetic field strength in the working air gap. As a result, the magnetic field at the Hall Effect sensor 116 does not fall off as rapidly as in a strictly straight-sided conical shape.

We claim:

1. A displacement sensor (100), comprising:
a rod (103) including a convex conical graduated magnetically anomalous region (105), with the convex conical graduated magnetically anomalous region (105) including a minimum cross-sectional size at a first end and continuously varying to a maximum cross-sectional size at a second end; and
a magnetic sensor (110) located in close proximity to the convex conical graduated magnetically anomalous region (105), with the magnetic sensor (110) comprising:
a coupling member (111) comprising two legs (112) and a top end (120);
two magnets (114) affixed to bottom leg ends of the two legs (112) of the coupling member (111); and
a Hall Effect sensor (116) affixed to the top end (120) of the coupling member (111), wherein the Hall Effect sensor (116) is in magnetic communication with the two magnets (114);
wherein the magnetic sensor (110) generates an absolute positional signal that is related to the position of the convex conical graduated magnetically anomalous region (105) in relation to the magnetic sensor (110).

2. The displacement sensor (100) of claim 1, with the convex conical graduated magnetically anomalous region (105) being at least partially within the rod (103).

3. The displacement sensor (100) of claim 1, with the convex conical graduated magnetically anomalous region (105) being substantially fully within the rod (103).

4. The displacement sensor (100) of claim 1, with the convex conical graduated magnetically anomalous region (105) being substantially axially centered in the rod (103).

5. The displacement sensor (100) of claim 1, with the convex conical graduated magnetically anomalous region (105) comprising a convex conical graduated magnetically responsive insert (105).

6. The displacement sensor (100) of claim 1, with the rod (103) including a hollow portion (102) and with the convex conical graduated magnetically anomalous region (105) comprising a convex conical graduated magnetically responsive insert (105) residing in the hollow portion (102).

7. The displacement sensor (100) of claim 1, with the rod (103) being magnetic and with the convex conical graduated magnetically anomalous region (105) comprising a graduated bore portion (105).

8. The displacement sensor (100) of claim 1, with the rod (103) being magnetic and with the convex conical graduated magnetically anomalous region (105) being formed from the rod (103).

9. The displacement sensor (100) of claim 1, wherein the two magnets (114) are substantially arranged along an arc corresponding to a rod surface.

10. The displacement sensor (100) of claim 1, with the two magnets (114) comprising two substantially opposite magnets.

11. A displacement sensor (100), comprising:
a rod (103) including a convex conical graduated magnetically anomalous insert (105), with the convex conical graduated magnetically anomalous insert (105) including a minimum cross-sectional size at a first end and continuously varying to a maximum cross-sectional size at a second end; and
a magnetic sensor (110) located in close proximity to the convex conical graduated magnetically anomalous insert (105), with the magnetic sensor (110) comprising:
a coupling member (111) comprising two legs (112) and a top end (120);
two magnets (114) affixed to bottom leg ends of the two legs (112) of the coupling member (111), with the two magnets (114) comprising two substantially opposite magnets and wherein the two magnets (114) are substantially arranged along an arc corresponding to a rod surface; and
a Hall Effect sensor (116) affixed to the top end (120) of the coupling member (111), wherein the Hall Effect sensor (116) is in magnetic communication with the two magnets (114);
wherein the magnetic sensor (110) generates an absolute positional signal that is related to the position of the convex conical graduated magnetically anomalous insert (105) in relation to the magnetic sensor (110).

12. The displacement sensor (100) of claim 11, with the convex conical graduated magnetically anomalous insert (105) being at least partially within the rod (103).

13. The displacement sensor (100) of claim 11, with the convex conical graduated magnetically anomalous insert (105) being substantially fully within the rod (103).

14. The displacement sensor (100) of claim 11, with the convex conical graduated magnetically anomalous insert (105) being substantially axially centered in the rod (103).

15. The displacement sensor (100) of claim 11, with the rod (103) including a hollow portion (102) and with the convex conical graduated magnetically responsive insert (105) residing in the hollow portion (102).

16. A displacement sensor (100), comprising:
a magnetic rod (103) including a convex conical graduated bore portion (105), with the convex conical graduated bore portion (105) including a minimum cross-sectional size at a first end and continuously varying to a maximum cross-sectional size at a second end; and
a magnetic sensor (110) located in close proximity to the convex conical graduated bore portion (105), with the magnetic sensor (110) comprising:
a coupling member (111) comprising two legs (112) and a top end (120);
two magnets (114) affixed to bottom leg ends of the two legs (112) of the coupling member (111), with the two magnets (114) comprising two substantially opposite magnets and wherein the two magnets (114) are substantially arranged along an arc corresponding to a rod surface; and
a Hall Effect sensor (116) affixed to the top end (120) of the coupling member (111), wherein the Hall Effect sensor (116) is in magnetic communication with the two magnets (114);
wherein the magnetic sensor (110) generates an absolute positional signal that is related to the position of the convex conical graduated bore portion (105) in relation to the magnetic sensor (110).

17. The displacement sensor (100) of claim 16, wherein the two magnets (114) are substantially arranged along an arc corresponding to a rod surface.

18. The displacement sensor (100) of claim 16, with the two magnets (114) comprising two substantially opposite magnets.

19. A displacement sensor (100), comprising:

a magnetic rod (103) including a convex conical graduated magnetically anomalous region (105) formed from the rod (103), with the convex conical graduated magnetically anomalous region (105) including a minimum cross-sectional size at a first end and continuously varying to a maximum cross-sectional size at a second end; and a magnetic sensor (110) located in close proximity to the convex conical graduated magnetically anomalous region (105), with the magnetic sensor (110) comprising:

a coupling member (111) comprising two legs (112) and a top end (120);

two magnets (114) affixed to bottom leg ends of the two legs (112) of the coupling member (111), with the two magnets (114) comprising two substantially opposite magnets and wherein two magnets (114) are substantially arranged along an arc corresponding to a rod surface; and a Hall Effect sensor (116) affixed to the top end (120) of the coupling member (111), wherein the Hall Effect sensor (116) is in magnetic communication with the two magnets (114);

wherein the magnetic sensor (110) generates an absolute positional signal that is related to the position of the convex conical graduated magnetically anomalous region (105) in relation to the magnetic sensor (110).

* * * * *